United States Patent
Dai

(10) Patent No.: US 8,456,276 B2
(45) Date of Patent: Jun. 4, 2013

(54) REMOTE CONTROL DEVICES AND METHOD FOR PREVENTING ACCIDENTAL OPERATION THEREOF

(75) Inventor: Lung Dai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 307 days.

(21) Appl. No.: 12/819,395

(22) Filed: Jun. 21, 2010

(65) Prior Publication Data

US 2011/0133885 A1  Jun. 9, 2011

(30) Foreign Application Priority Data

Dec. 8, 2009 (CN) .......................... 2009 1 0311064

(51) Int. Cl.
*G05B 19/00* (2006.01)
*G05B 23/02* (2006.01)

(52) U.S. Cl.
USPC ....... 340/5.28; 340/3.71; 340/5.31; 340/5.61; 340/5.63

(58) Field of Classification Search
USPC ................ 340/5.28, 5.63, 825.22, 5.31, 5.61, 340/3.71; 348/734, 5.5
See application file for complete search history.

(56) References Cited

U.S. PATENT DOCUMENTS

| | | | | |
|---|---|---|---|---|
| 5,883,680 A * | 3/1999 | Nykerk | .......................... | 348/734 |
| 6,111,518 A * | 8/2000 | Han | .............................. | 341/176 |
| 7,792,544 B2 * | 9/2010 | Vogedes et al. | ............. | 455/550.1 |
| 8,020,780 B2 * | 9/2011 | Schultz et al. | .................. | 236/51 |
| 8,330,584 B1 * | 12/2012 | Pfanstiehl | .................. | 340/12.23 |
| 2004/0203604 A1 * | 10/2004 | Pugliese | ....................... | 455/411 |

* cited by examiner

*Primary Examiner* — Daniel Wu
*Assistant Examiner* — Mancil Littlejohn
(74) *Attorney, Agent, or Firm* — Altis Law Group, Inc.

(57) ABSTRACT

A remote control device and method, the remote control being changeable between an unlocked state and a locked state includes a communicating unit for allowing the remote control device to communicate with and remotely control a controlled apparatus and a processor electronically connected with the communicating unit. The processor is configured for unlocking the remote control device from the locked state, such that the remote control device communicates with and remotely control the controlled apparatus, and is configured for locking the remote control device into the locked state, such that communication between the remote control device and the controlled apparatus is disabled the remote control device cannot remotely control the controller apparatus. A method for preventing accidental operations of the remote control device is also disclosed.

11 Claims, 5 Drawing Sheets

REMOTE CONTROL DEVICES AND METHOD FOR PREVENTING ACCIDENTAL OPERATION THEREOF

BACKGROUND

1. Technical Field

The present disclosure relates to remote control devices, and particularly to a remote control capable of preventing a user from accidentally operating the remote control device.

2. Description of Related Art

Remote control devices are widely used to remotely control another electronic device, such as a television (TV). However, the remote control device is often accidentally operated by the user, and the TV may be changed to an undesired mode. For example, the TV could be changed from a first channel to a second channel interrupting the user's information flow from the first channel.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiments of the remote control device. Moreover, in the drawings, like reference numerals designate corresponding parts throughout several views.

DETAILED DESCRIPTION

Figure 1:
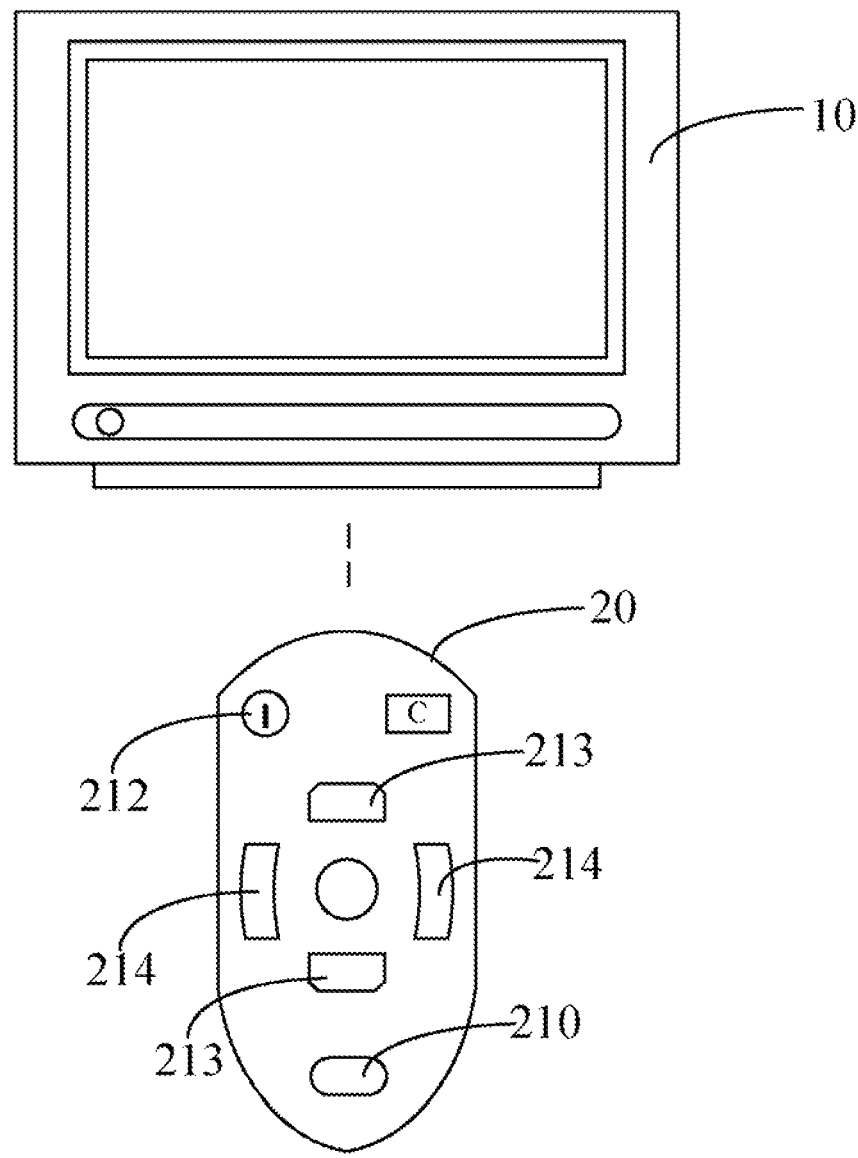
FIG. 1 is a schematic diagram showing a remote-control system in accordance with an embodiment; the remote-control system includes a remote control device.
Figure 2:
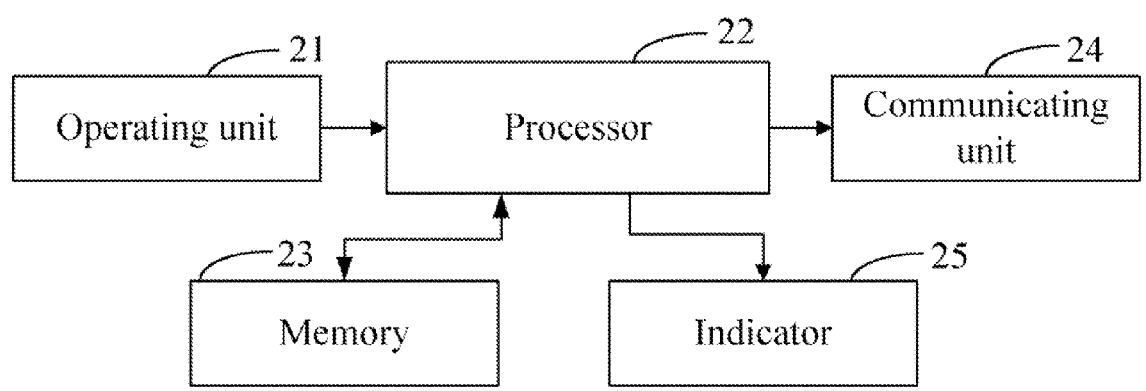
FIG. 2 is a block diagram of a remote control device of FIG. 1 in accordance with an embodiment.

Referring to FIGS. 1-2, a remote-control system 100 includes a controlled apparatus, which in this embodiment is a television (TV) 10, and a remote control device 20. The remote control device 20 is capable of being changed between a locked state and an unlocked state. When the remote control device 20 is in the locked state, communication between the remote control device 20 and the TV 10 is disabled, and the remote control device 20 cannot remotely control the TV 10. When the remote control device 20 is in the unlocked state, the remote control device 20 can communicate with the TV 10, and remotely control the TV 10. In other embodiments, the controlled apparatus could be, for example, a DVD player.

The remote control device 20 includes an operating unit 21, a processor 22, a memory 23, and a communicating unit 24. The operating unit 21, the memory 23 and the communicating unit 24 are electronically connected to the processor 22. The operating unit 21 includes a plurality of keys or buttons for generating corresponding operating signals in response to user operations. When the remote control device 20 is in the unlocked state, the processor 22 generates corresponding controlling signals to control the TV 10 in response to the operating signals generated by the operating unit 21. When the remote control device 20 is in the locked state, the processor 22 authenticates the operating signals generated by the operating unit 21, and generates an unlocked signal to unlock the remote control device 20 if the operating signals match with predetermined authentication information. The memory 23 is configured to store the predetermined authentication information, and a plurality of predetermined time values, such as a first predetermined time T10 and a second predetermined time T20. The communicating unit 24 is configured to transmit the controlling signals generated by the processor 22 to the TV 10 while the remote control device 20 is in the unlocked state, so communication is established between the remote control device 20 and the TV 10, whereby the remote control device 20 is capable of remotely controlling the TV 10.

The operating unit 21 includes an activating key 210, a switch 212 for turning on/off the remote control device 20, and a plurality of controlling keys, such as, keys 213 for selecting channels, and keys 214 for adjusting volume of the TV 10. When the remote control device 20 is in the locked state, the activating key 210 is configured to generate an activating signal in response to user operations for activating the remote control device 20. The keys 213, 214 are configured for generating first and second operating signals respectively in response to user operations. The first, and second operating signals are used as authentication information for unlocking the remote control device 20 when the remote control device 20 is in the locked state, and act as controlling signals for controlling the TV 10 while the remote control device 20 is in the unlocked state. The operating unit 21 may include other keys (not shown) for adjusting parameters of the TV, such as brightness, and the other keys can also cooperate with the keys 213, 214 to generate authenticating information for an unlocking signal.

Figure 3:
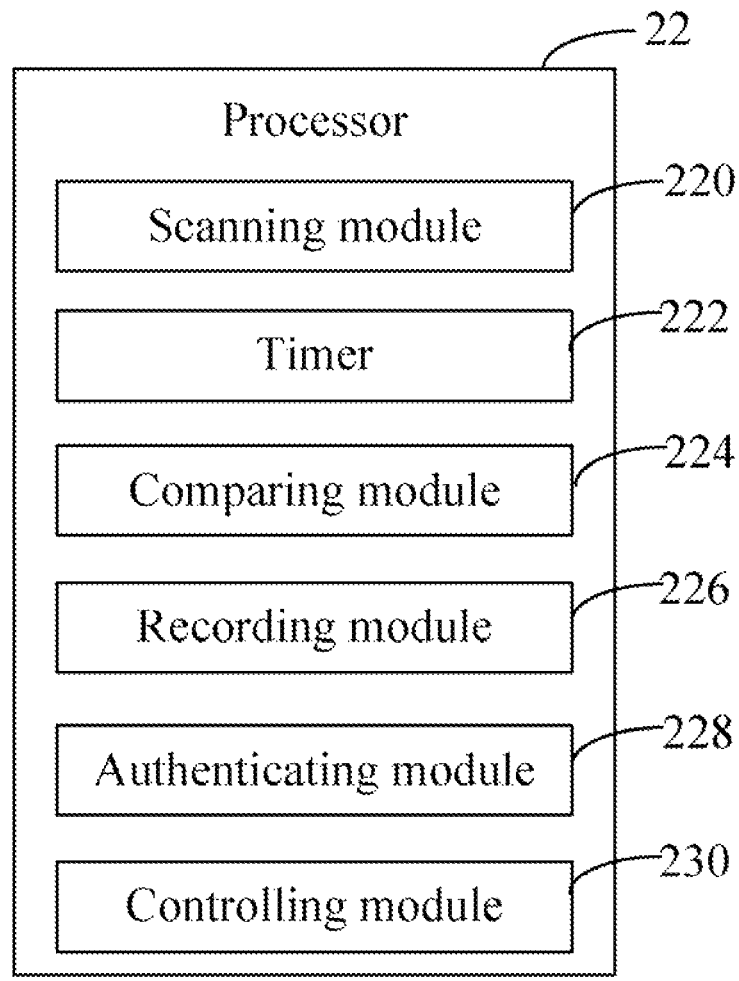
FIG. 3 is a block diagram of the processor of FIG. 2 in accordance with an embodiment.

Referring to FIG. 3, the processor 22 includes a scanning module 220, a timer 222, a comparing module 224, a recording module 226, an authenticating module 228, and a controlling module 230.

The scanning module 220 is configured to scan operating signals generated by the operating unit 21, and generate corresponding scanning signals according to the scanned operating signals and transmit the scanning signals to the controlling module 230. When the remote control device 20 is in the locked state, the scanning module 220 generates a first scanning signal if the activating key 210 generates the activating signal. After the activating key 210 generates the activating signal, the scanning module 220 further generates second and third scanning signals respectively used for authenticating information according to the first and second operating signals generated by the keys 213, 214. It is noteworthy to say the scanning module 220 generates corresponding second and third scanning signals for controlling signals in response to the operations of the keys 213, 214 when the remote control device 20 is in the unlocked state, to remotely control the TV 10. In the following descriptions, for simplicity, the second and third scanning signals are respectively set as "0" and "1".

The timer 222 is configured for timing When the controlling module 230 receives the first scanning signal generated by the scanning module 220, the controlling module 230 controls the timer 222 to record a first time T1.

The comparing module 224 is configured to compare the first time T1 with the first predetermined time T10, and sends a signal to the controlling module 230.

When the remote control device 20 is in the locked state and the first time T1 is less than or equal to the predetermined first time T10, the recording module 226 is configured to record the second and third scanning signals generated by the scanning module 220 in turn to generate authenticating information. For example, during the first time T1 is less than or equal to the first predetermined time T10, the scanning module 220 has generated "0", "1", "0", "1" "0", "1" in turn, and the recording module 226 records the second and third scanning signals as: 010101. As a result, a group of authenticating information 010101 is obtained.

The authenticating module 228 is configured to generate the unlocking signal and transmit the unlocking signal to the controlling module 230 if the authenticating information generated by the recording module 226 matches with the predetermined authenticating information. For example, if the predetermined authenticating information is also 010101, that is, the obtained authenticating information 010101 above matches with the predetermined authenticating information. As a result, the authenticating module 228 generates the unlocking signal and transmits the unlocking signal to the controlling module 230, and the controlling module 230 unlocks the remote control device 20 in response to the unlocking signal, thereby the remote control device 20 is changed from the locked state to the unlocked state.

The controlling module 230 is configured to unlock the remote control device 20 according to the unlocked signals generated by the authenticating module 228, and generates controlling signals according to the received second and third scanning signals from the scanning module 220 when the remote control device 20 is in the unlocked state and further transmits the controlling signals to the communicating unit 24.

Furthermore, the timer 222 is further used to record a second time T2 when the remote control device 20 is unlocked by the controlling module 230, and the comparing module 224 is further used to compare the second time T2 with the second predetermined time T20 and sends yet another signal to the controlling module 230. The controlling module 230 further changes the remote control device 20 from the unlocked state to the locked state if no second and third scanning signals are received from the scanning module 220 during the second time T2 is less than or equal to the second predetermined time T20. That is, if the keys 213, 214 are not operated during the second time T2 is less than or equal to the second predetermined time T20, the remote control device 20 is automatically locked, whereby accidental operations of the remote control device 20 are avoided.

In additional, the remote control device 20 also includes an indicator 25. The indicator 25 is controlled by the processor 22 to generate an indicating signal for indicating a working state of the remote control device 20. In the embodiment, the indicator 25 is a light-emitting diode (LED), when the remote control device 20 is in the unlocked state, the indicator 25 emits green light; when the remote control device 20 is in the locked state, the indictor 25 emits red light.

Figure 4A:
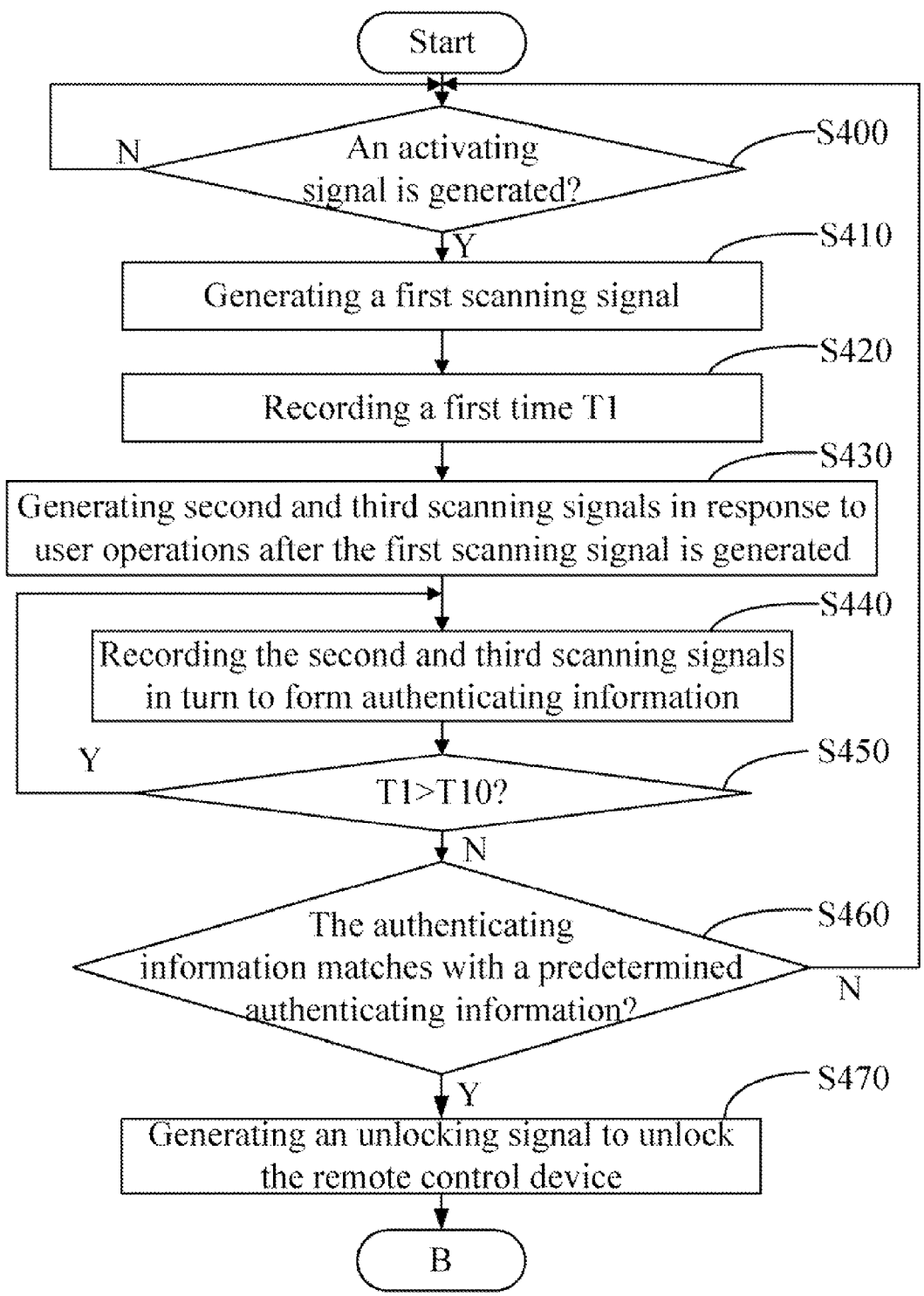
FIGS. 4A and 4B are flowcharts of a method applied in the remote control device of FIG. 1 for preventing an accidental operation in accordance with the embodiment.
Figure 4B:
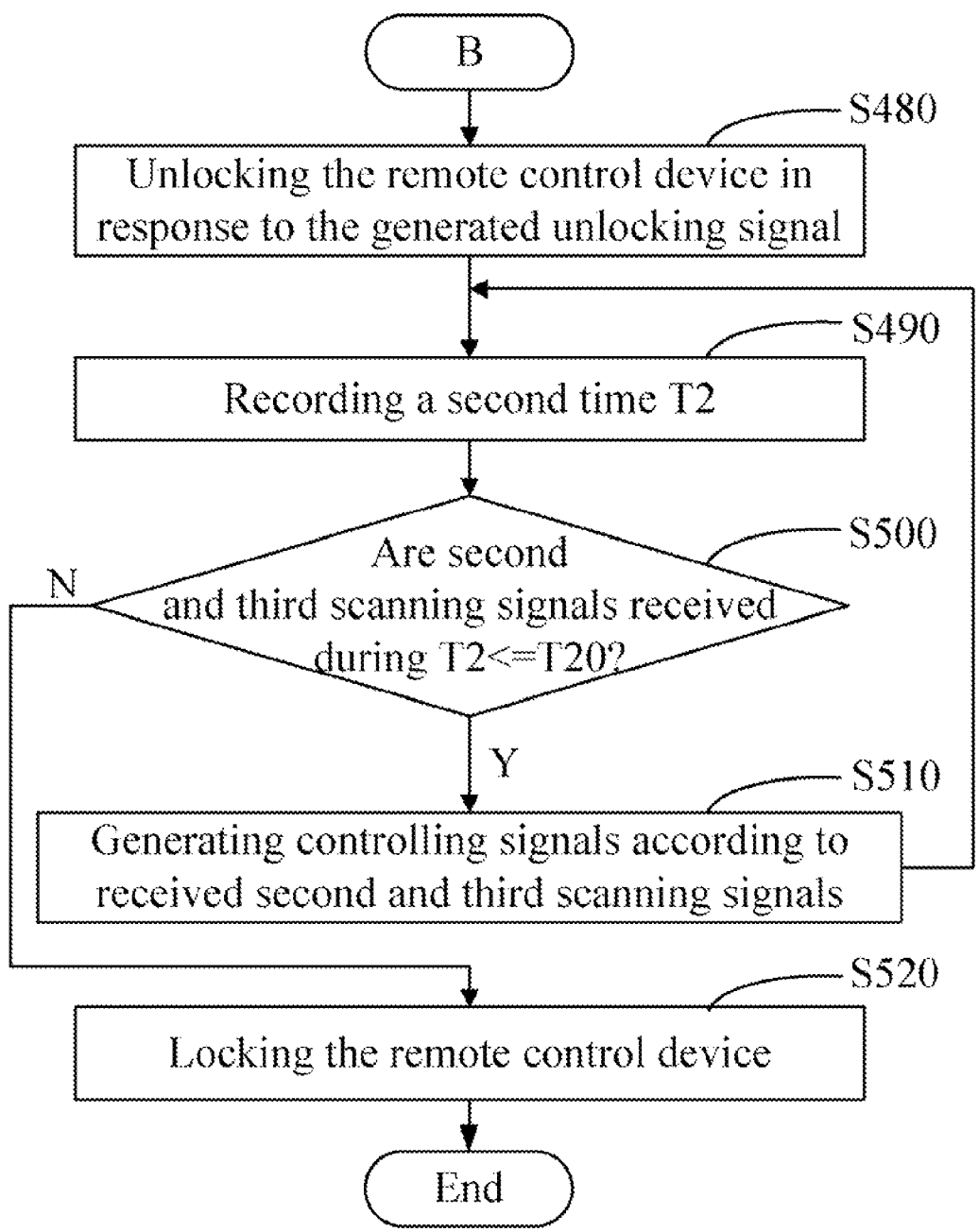

Referring to FIGS. 4A and 4B, a method for preventing accidental operations of the remote control device 20 of FIG. 1 is shown. The method includes the following steps, each of which is tied to various modules contained in the remote control device 20 as shown in FIGS. 2 and 3.

At step S400, the scanning module 220 scans whether an activating signal is generated by the activating key 210. If not, the procedure returns to step S400, and if yes, the procedure goes to step S410.

At step S410, the scanning module 220 generates a first scanning signal and transmits the first scanning signal to the controlling module 230 if an activating signal is generated by the activating key 210.

At step S420, the controlling module 230 controls the timer 222 to record a first time T1 when the first scanning signal is generated by the scanning module 220.

At step S430, the scanning module 220 further generates second and third scanning signals respectively in response to operations of the controlling keys 213, 214 when the first scanning signal is generated by the scanning module 220.

At step S440, the controlling module 230 controls the recording module 226 to record the second and third scanning signals in turn, to form authenticating information.

At step S450, the comparing module 224 compares the first time T1 with the first predetermined time T10 stored in the memory 23, and sends a signal to the controlling module 230, if the first time T1 is greater the first predetermined time T10, the procedure goes to step S460, and if the first time T1 is less than or equal to the first predetermined time T10, the procedure returns to step S440.

At step S460, the authenticating module 228 authenticates whether the formed authenticating information matches with the predetermined authenticating information, if yes, the procedure goes to step 470, and if not, the procedure returns to step S400.

At step S470, the authenticating module 228 generates an unlocking signal and transmits the unlocking signal to the controlling module 230.

At step S480 (see FIG. 4B), the controlling module 230 unlocks the remote control device 20 in response to the unlocking signal form the authenticating module 228, thereby the remote control device 20 is changed from the locked state to the unlocked state.

At step S490, after the remote control device 20 is unlocked, the controlling module 230 further controls the timer 200 to record a second time T2.

At step S500, the controlling module 230 determines whether it receives the second and third scanning signals during the second time T2 is less than or equal to the second predetermined time T20 (T2<=T20), if yes, the procedure goes to step S510, if not, the procedure goes to S520.

At step S510, the controlling module 230 generates controlling signals in response to the received second and third scanning signals to the communicating module 24, to remotely control the TV 10.

At step S520, the controlling module 230 locks the remote control device 20.

As described above, by virtue of the remote control device 20 and the method applied thereon, thereby, preventing accidental operations of the remote control device 20.

It should be noted that the various steps in the method illustrated in FIGS. 4A and 4B may be performed in the order presented, or may be performed in a different order. Furthermore, in some embodiments, some steps can be added to the method, for example, when the authenticating information does not match with the predetermined authenticating information, the controlling module 230 generates an indicating information such as a voice, to indicate the user that the authenticating information is incorrect.

It is believed that the present embodiments and their advantages will be understood from the foregoing description, and it will be apparent that various changes may be made thereto without departing from the spirit and scope of the disclosure or sacrificing all of its material advantages, the examples described merely being preferred or exemplary embodiments of the disclosure.

What is claimed is:

1. A remote control device being changeable between an unlocked state and a locked state, the remote control device comprising:
   a communicating unit adapted to communicate with and remotely control a controlled apparatus;
   an operating unit comprising an activating key for generating an activating signal and at least two different controlling keys for generating two different operating signals in response to user operation; and a processor electrically connected with the communicating unit and the operating unit, the processor configured for unlocking the remote control device from the locked state, such that the remote control device communicates with and remotely control the controlled apparatus, and configured for locking the remote control device into the locked state, such that the remote controlled apparatus is unabled to communicate with the controlled apparatus and cannot remotely control the controlled apparatus;

wherein when the remote control device is in the locked state, the processor records the order of the different operating signals to form authenticating information after the activating signal is generated, and further unlock the remote control device if the authenticating information matches with a predetermined authenticating information;

wherein the processor comprises a scanning module, a recording module, an authenticating module and a controlling module, the scanning module is configured to generate a first scanning signal if the activating key generates an activating signal and is configured to generate two different second scanning signals in response to the different operating signals generated by the at least two different controlling keys after the first scanning signal is generated, the recording module is configured to record the order of the second scanning signals so as to form authenticating information for unlocking the remote control device, the authenticating module is configured to generating an unlocking signal if the authenticating information matches with a predetermined authenticating information, and the controlling module is configured to unlock the remote control device in response to the unlocked signal; wherein the processor further comprises a timer and a comparing module, the timer is configured to record a first time after the scanning module generates the first scanning signal, the comparing module is configured to compare the first time with a first predetermined time and send a first signal to the controlling module, and the controlling module controls the recording module to record the order of the different second scanning signals to form authenticating information for unlocking the remote control device if the first time is not greater than the first predetermined time.

2. The remote control device of claim 1, wherein the processor generates controlling signals according to the different operating signals when the remote control device is in the unlocked state.

3. The remote control device of claim 1, wherein when the remote control device is in the unlocked state, the controlling module is further configured to generate a controlling signal in response to the different operating signals generated by the at least two different controlling keys, and is configured to send to the communicating unit for remotely controlling the controlled apparatus.

4. The remote control device of claim 1, wherein the timer is further configure to record a second time after the remote control device is unlocked, and the comparing module is further configured to compare the second time with a second predetermined time and send a second signal to the controlling module, and the controlling module generates a controlling signal in response to the operating signals generated by the at least two different controlling keys to the communicating unit so as to remotely control the controlled apparatus if the second time is not greater that the second predetermined time, generates a locking signal to lock the remote control device if the second time is greater than the second predetermined time.

5. The remote control device of claim 4, further comprising a memory, wherein the memory is configured to store the predetermined authenticating information, the first predetermined first time and the second predetermined time.

6. A method for preventing accidental operations of a remote control device, the remote control device changeable between a locked state in which the remote control device is unable to communicate with a controlled apparatus and an unlocked state in which the remote control device communicates with the controller apparatus so as to remotely control the controlled apparatus, the remote control device comprising an operating unit the operating unit comprising an activating key for generating an activating signal and at least two different controlling keys for generating two different operating signals in response to user operation, the method comprising:

recording the order of the different operating signals to generate authenticating information for unlocking the remote control device after the activating signal is generated when the remote control device is in the locked state;

generating an unlocking signal so as to unlock the remote control device if the authenticating information matches with a predetermined authenticating information; and generating a controlling signal for remotely controlling the controlled apparatus in response to the operating signals if the remote control device is unlocked from the locked state;

the method further comprising:

generating a first scanning signal if an activating signal is generated by the activating key; and generating different second scanning signals in response to the operating signals from the at least two different controlling keys after the first scanning signal is generated;

recording a first time after the first scanning signal is generated;

comparing the first time with a first predetermined time;

recording the order of the second scanning signals to form authenticating information for unlocking the remote control device from the locked state if the first time is not greater than the first predetermined time; and generating an unlocking signal to unlock the remote control device if the authenticating information matches with the predetermined authenticating information; and generating a controlling signal to remotely control the controlled apparatus if the remote control device is unlocked from the locked state.

7. The method of claim 6, further comprising: recording a second time after the remote control device is unlocked from the locked state; comparing the second time with a second predetermined time; generating the controlling signal to remotely control the controlled apparatus in response to the second scanning signals if there are second scanning signals received during the second time not greater than the second predetermined time; and generating a locking signal if there are no second scanning signals received during the second time not greater than the second predetermined time.

8. A remote-control system, comprising: a controlled apparatus; and a remote control device capable of communicating with the controlled apparatus so as to remotely control the controlled apparatus, the remote control device changeable between a locked state in which the remote control device is unable to communicate with a controlled apparatus and an unlocked state in which the remote control device communicates with and remotely control the controlled apparatus, the remote control device comprising: an operating unit comprising an activating key for generating an activating signal and at least two different controlling keys for generating two different operating signals in response to user operation; and a processor for receiving the activating signal and the different operating signals, wherein when the remote control device is in the locked state, the processor records the order of the different operating signals to form authenticating information after the activating signal is generated, and further unlock the remote control device if the authenticating information matches with a predetermined authenticating information, and when the remote control device is in the unlocked state, the processor generates a controlling signal so as to remotely control the controlled apparatus according to the operating signals; wherein the processor comprises a scanning module, a recording module, an authenticating module and a controlling module, the scanning module is configured to generate a first scanning signal if the activating key generates an activating signal and generate different second scanning signals in response to the operating signals generated by the at least two different controlling keys after the first scanning signal is generated, the recording module is configured to record the order of the second scanning signals so as to form authenticating information for unlocking the remote control device, the authenticating module is configured to generating an unlocking signal if the authenticating information matches with a predetermined authenticating information, and the controlling module is configured to unlock the remote control device in response to the unlocked signal; wherein the processor further comprises a timer and a comparing module, the timer is configured to record a first time after the scanning module generates the first scanning signal, the comparing module is configured to compare the first time with a first predetermined time and send a first signal to the controlling module, and the controlling module controls the recording module to record the second scanning signals to form authenticating information for unlocking the remote control device if the first time is not greater than the first predetermined time.

9. The remote-control system of claim 8, wherein the controlling module is further configured to generate a controlling signal in response to the operating signals generated by the at least two different controlling keys, and is configured to send the controlling signal to the communicating unit to remotely control the controlled apparatus.

10. The remote-control system of claim 8, wherein the timer is further configure to record a second time after the remote control device is unlocked, and the comparing module is further configured to compare the second time with a second predetermined time and send a second signal to the controlling module, and the controlling module generates a controlling signal in response to the operating signals generated by the at least two different controlling keys to the communicating unit so as to remotely control the controlled apparatus if the second time is not greater that the second predetermined time, generates a locking signal to lock the remote control device if the second time is greater than the second predetermined time.

11. The remote-control system of claim 10, further comprising a memory, wherein the memory is configured to storing the predetermined authenticating information, the first predetermined time and the second predetermined time.

* * * * *